United States Patent [19]

Deli

[11] Patent Number: 5,024,283

[45] Date of Patent: Jun. 18, 1991

[54] PIVOTABLE, RESILIENT MOUNTING

[75] Inventor: Jack M. Deli, Winfield, Ill.

[73] Assignee: Komatsu Dresser Company, Libertyville, Ill.

[21] Appl. No.: 475,819

[22] Filed: Feb. 6, 1990

[51] Int. Cl.⁵ .......................................... B62D 33/067
[52] U.S. Cl. .................................. 180/89.14; 267/293; 296/35.1; 296/190; 403/79; 403/111; 403/120
[58] Field of Search ............................ 180/89.14, 89.12; 280/716; 267/140.4, 141.2, 141.3, 293; 403/79, 111, 118, 120; 296/190, 35.1, 35.3

[56] References Cited

U.S. PATENT DOCUMENTS

| | | | |
|---|---|---|---|
| 3,508,784 | 4/1970 | Small | 296/35.1 |
| 3,656,799 | 4/1972 | Malm et al. | 296/35.1 |
| 3,789,945 | 2/1974 | Hansen | 180/69.2 |
| 3,797,604 | 3/1974 | Davis | 180/89.1 |
| 3,985,385 | 10/1976 | Kennicutt et al. | 296/35.1 |
| 3,990,737 | 11/1976 | Palmer | 296/35.1 |
| 4,061,392 | 12/1977 | Lowder et al. | 180/89.14 |
| 4,135,757 | 1/1979 | Smith et al. | 296/35.1 |
| 4,143,903 | 3/1979 | Yoshida et al. | 296/35.1 |
| 4,400,898 | 8/1983 | Christensen et al. | 37/118 A |
| 4,451,079 | 5/1984 | Takahashi | 296/190 |
| 4,515,234 | 5/1985 | Loy et al. | 180/89.12 |
| 4,772,150 | 9/1988 | Horton | 403/39 |

FOREIGN PATENT DOCUMENTS

| | | | |
|---|---|---|---|
| 3519868 | 12/1986 | Fed. Rep. of Germany | 180/89.14 |
| 224552 | 7/1985 | German Democratic Rep. | 180/89.14 |

Primary Examiner—Charles A. Marmor
Assistant Examiner—Tamara L. Finlay

[57] ABSTRACT

A tiltable element, e.g. an operator's cab, is resiliently supported on a body frame by a plurality of pivotable mounting devices. Each device comprises a pair of parallel bracket members and a support element. The support element and the bracket members have coaxial openings therethrough with a generally cylindrical shaft positioned in the openings. The shaft has first and second externally threaded end sections and an intermediate section. The diameter of the first end section is greater than the diameter of the intermediate section so as to form a first shoulder therebetween. The opening in one bracket member has internal threads to matingly receive the threads on the first shaft end section. An annular shell has an inner diameter at least as large as the diameter of the intermediate shaft portion and less than the diameter of the first shaft end section. An annular resilient sleeve is mounted between and in contact with the annular shell and the support element. An annular spacer sleeve is loosely telescoped over the second shaft end and freely extends through the opening in the second bracket member. An internally threaded retention element engages the threads on the second shaft end section to fixedly position the annular shell and spacer sleeve between the first shoulder and the retention element. This arrangement permits accommodation of variations in the lateral positioning of the brackets with respect to the support element.

24 Claims, 3 Drawing Sheets

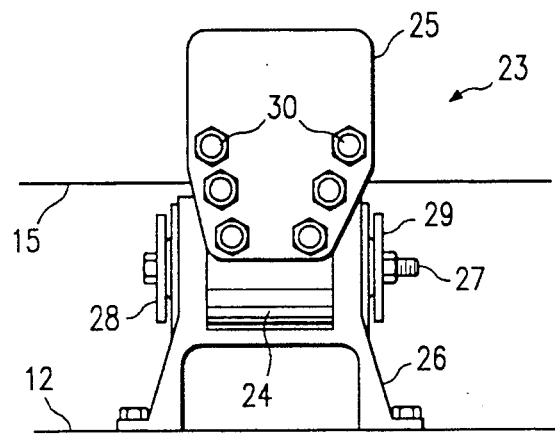
FIG. 3
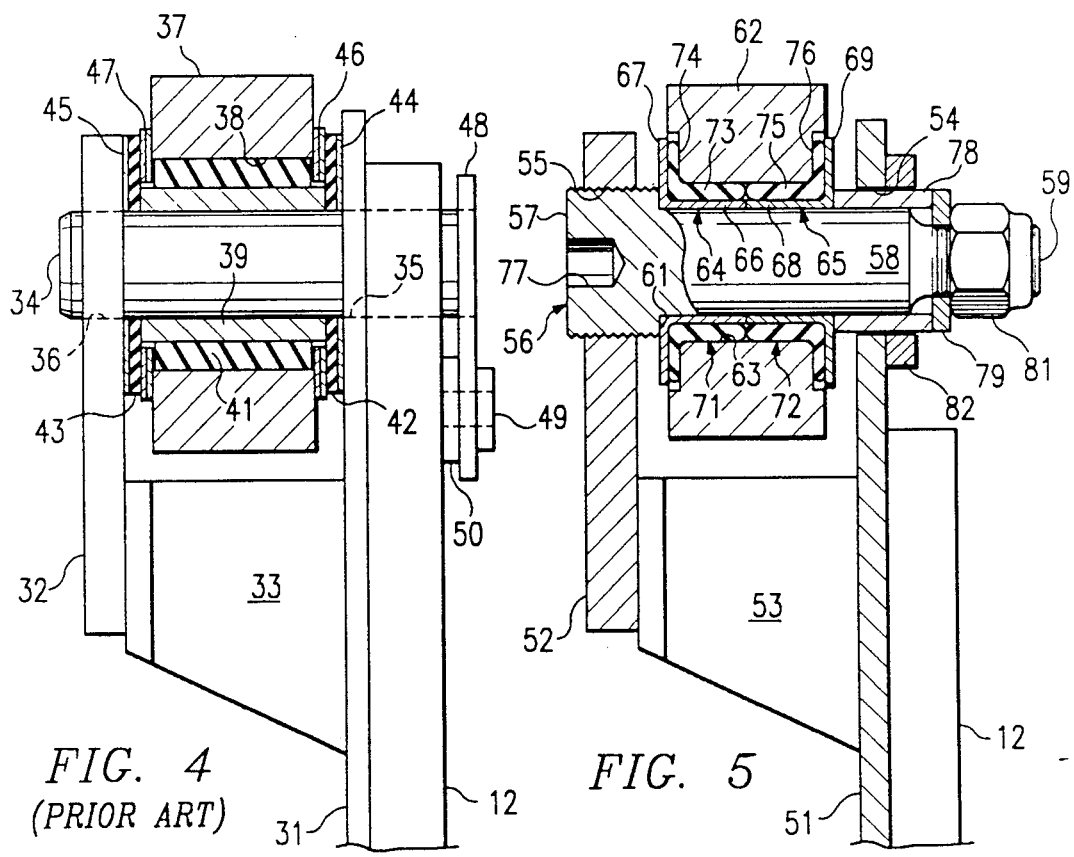
FIG. 4
(PRIOR ART)
FIG. 5

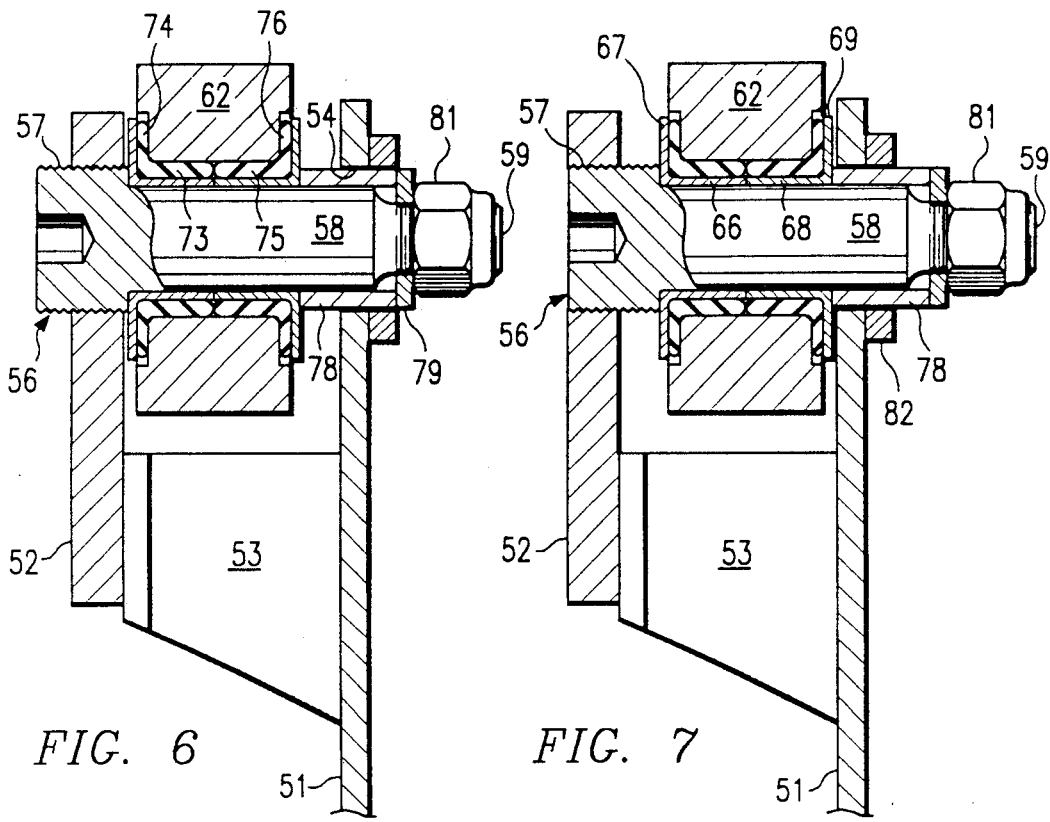
FIG. 6
FIG. 7
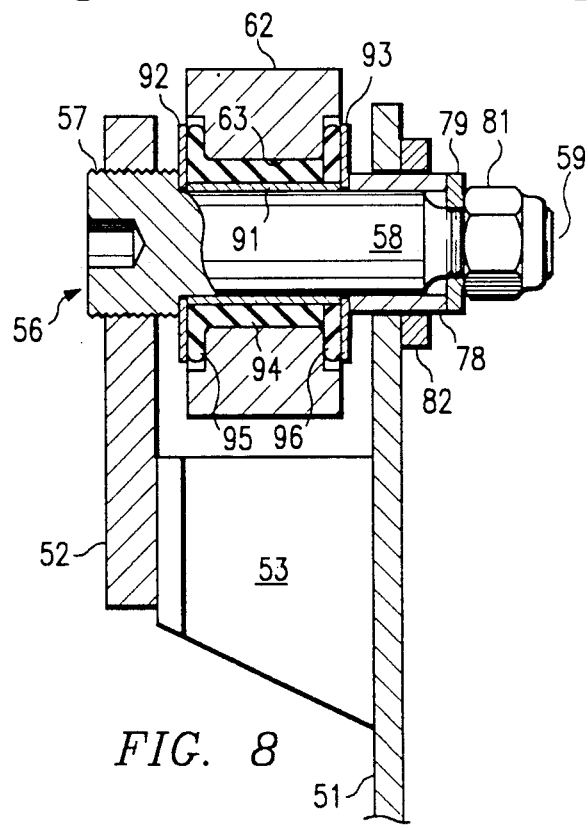
FIG. 8

5,024,283

PIVOTABLE, RESILIENT MOUNTING

FIELD OF THE INVENTION

This invention relates to apparatus for pivotably and resiliently mounting a tiltable element to a body frame. In one specific aspect the invention relates to apparatus for pivotably and resiliently mounting a tiltable element on a vehicle. In another aspect the invention relates to a vehicle, e.g. a tractor body, having a tiltable operator cab pivotably and resiliently mounted thereon.

BACKGROUND OF THE INVENTION

Various types of vehicles are provided with an operator's cab which is tiltably mounted on the vehicle frame to permit the cab to be tilted upwardly to provide access to the equipment located beneath the cab structure. Such vehicles include various types of earth-moving and construction vehicles, e.g., bulldozers, crawler loaders, trucks, and the like. As earth-moving and construction vehicles are normally subjected to substantial vibrations and impacts, it is common to provide cushioning means to support the operator's cab on the vehicle frame. However, it is important that the cab structure and the cab mounting means provide adequate protection for the operator in the event of a rollover of the vehicle.

One of the difficulties in providing pivotable mountings for the cab is variations between the spacing of the pivot hinge elements on the cab and the spacing of the pivot hinge elements on the chassis frame. When the hinge elements on either the frame or the cab are made narrower to ensure that they will fit within the opposing hinge elements, the resulting pivot hinges are loose. The looseness can be avoided to some degree by the use of shims to provide lateral pre-load, but it is impossible to pre-load the elastomeric elements with shims to compensate for the variations in the positions of the hinge elements.

SUMMARY OF THE INVENTION

Accordingly, it is an object of the present invention to provide an improved means for pivotably and resiliently mounting a tiltable element to a body frame. Another object of the invention is to provide an improved pivot hinge for pivotably and resiliently mounting a tiltable element on a vehicle. Another object of the invention is to provide an improved pivot hinge for resiliently mounting a tiltable operator cab on a vehicle chassis. A further object of the invention is to provide a pivot hinge which can accommodate variations between the spacing of the pivot hinge elements on the vehicle chassis and the spacing of the pivot hinge elements on the operator cab. Another object of the invention is to provide a precise lateral preload to elastomeric shock mounts. A further object of the invention is to eliminate the need for the use of shims to compensate for variations in lateral location of the brackets for pivotable resilient mountings.

In accordance with the present invention, a tiltable element is resiliently supported on a body frame by a plurality of devices for pivotably mounting said tiltable element to the body frame, wherein each device comprises first and second spaced apart, generally parallel bracket members secured to one of the body frame and the tiltable element, a support element secured to other of the body frame and the tiltable element, the support element and the first and second bracket members having coaxial openings with a generally cylindrical shaft positioned in the openings. The shaft has first and second externally threaded end portions with an intermediate portion therebetween, the diameter of the first end portion being greater than the diameter of the intermediate portion so as to form a first shoulder therebetween. The opening in the first bracket member has internal threads to matingly receive the threads on the first shaft end portion. An annular shell has an inner diameter at least as large as the diameter of the intermediate shaft portion and less than the diameter of the first shaft end portion. An annular resilient sleeve is mounted circumferentially about said annular shell and in contact with the annular shell and the support element. An annular spacer sleeve is telescoped over the second end portion of the shaft and extends through the opening in the second bracket member, with the outer diameter of the spacer sleeve being slightly less than the diameter of that opening. An internally threaded retention element engages the threads on the second shaft end portion to fixedly position the annular shell and spacer sleeve between the first shoulder and the retention element.

Other aspects, objects, and advantages of the invention will be apparent from the following description and the accompanying drawings.

BRIEF DESCRIPTION OF THE DRAWINGS

FIG. 3 is a detail side elevational view of a right rear landing foot for the crawler loader of FIG. 1;

FIG. 4 is a detail front elevational view, partly in cross section, of a right front pivot hinge for the crawler loader of FIG. 1 in accordance with a prior art design;

FIG. 5 is a detail front elevational view, partly in cross section, of a right front pivot hinge for the crawler loader of FIG. 1 in accordance with a first embodiment of the present invention;

FIG. 6 is a detail front elevation view of the right front pivot hinge of FIG. 5 with the cab support element being offset to the left, as viewed in FIG. 6;

FIG. 7 is a detail front elevation view of the right front pivot hinge of FIG. 5 with the cab support element being offset to the right, as viewed in FIG. 7; and FIG. 8 is a detail front elevation view of the right front pivot hinge for the crawler loader of FIG. 1 in accordance with a second embodiment of the present invention.

DETAILED DESCRIPTION

Figure 1:
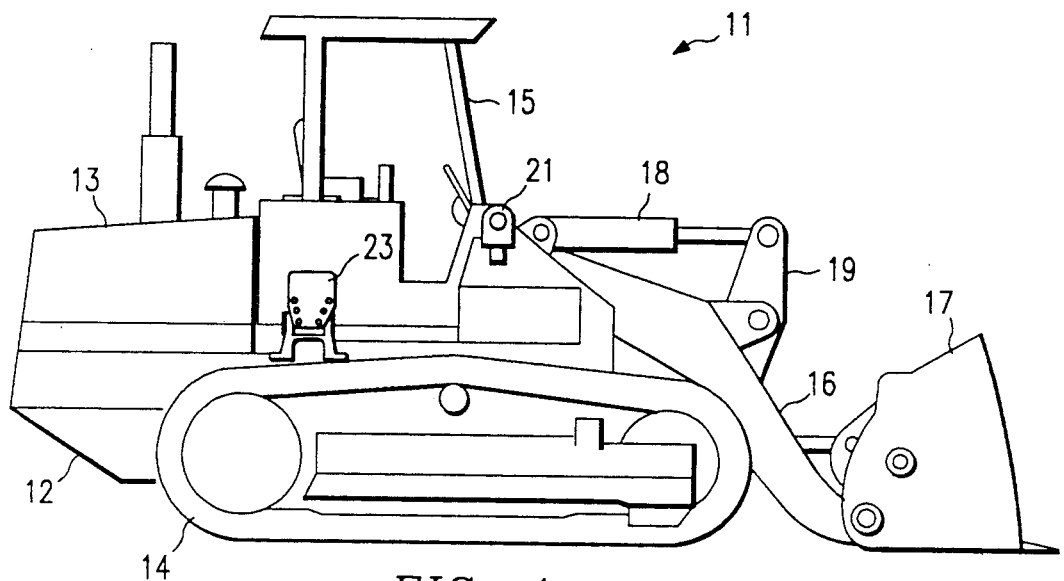
FIG. 1 is a simplified side elevational view of a crawler loader showing the right front pivot hinge and the right rear landing foot for the tiltable operator cab.
Figure 2:
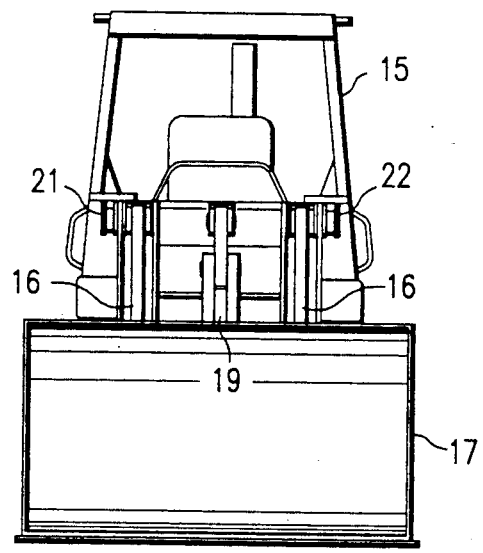
FIG. 2 is a front elevational view of the crawler loader of FIG. 1.

Referring now to the drawings in detail, the crawler loader 11, shown in FIGS. 1 and 2, comprises a vehicle chassis frame 12, an engine compartment 13, a pair of endless tracks 14, an operator's cab or pod 15, a pair of boom arms 16, a bucket 17 mounted on the outer ends of boom arms 16, and a hydraulic cylinder 18 having one end pivotably mounted on chassis frame 12 with the other end connected to mechanical linkage 19 to control the movement of bucket 17 relative to the chassis frame 12. The pod 15 is pivotably mounted on chassis frame 12 by pivot hinges 21 and 22, located at the right front and left front of the pod 15, respectively, so that the rear of the pod can be raised by tilting the pod 15 about pivot hinges 21 and 22. The left front pivot hinge 22 is identical to the right front pivot hinge 21 except that it has been rotated 180° in a horizontal plane. The rear of the pod 15 is supported by a right rear foot 23 and a left rear foot (not shown). Although the rear mounts take the majority of forces during rollover and rear push, the front mounts are necessary since they take some of the load. All four mounts should provide means for isolating the pod from structure borne vibrations travelling through the vehicle chassis.

Referring now to FIG. 3, the right rear foot 23 comprises an annular metal element 24 mounted below pod 15 by one or more brackets 25. Annular element 24 is loosely positioned between the vertical arms of a mounting bracket 26 which is bolted to vehicle chassis 12. Annular element 24 is retained within mounting bracket 26 by virtue of bolt 27 and retention washers 28 and 29, with bolt 27 extending through openings in the vertical arms of mounting bracket 26. The opening through annular element 24 is enlarged at each end in the form of an outwardly diverging frustoconical section. A pair of tapered annular shock absorber elements (not shown) are positioned between annular element 24 and bolt 27 in the tapered portions of the opening through annular element 24. Under normal operating conditions, the shock absorber elements located within cylindrical shell 24 assist in cushioning the operator's cab against vibrations of the vehicle chassis, by permitting relative movement between mounting bracket 26 and cylindrical element 24. When it is desired to tilt the operator's cab, the bolts 30 which secure each rear foot mounting bracket 25 to the operator's cab 15 are removed, and the operator's cab can be moved upwardly away from the mounting brackets 25.

Referring now to FIG. 4, the right front pivot hinge 21 in a prior art design has a first bracket member 31 securely mounted to a portion of chassis frame 12, while a second bracket member 32 is spaced from and generally parallel to first bracket member 31 by a support element 33. Support element 33 can be welded to bracket members 31 and 32, with bracket member 31 being welded to the vehicle chassis 12. The bracket members 31 and 32 are machined to the desired configuration prior to the placement of the bracket members on the vehicle. The location of the bracket members 31 and 32 along a horizontal line perpendicular to the longitudinal centerline of the vehicle can vary due to variations in the welding operations or other factors. A shaft 34 is fixedly positioned in coaxial openings 35 and 36, located in bracket members 31 and 32, respectively. Pod support element 37 is fixedly secured to pod 15, and has a thickness which is less than the distance between bracket members 31 and 32. Pod support member 37 has a cylindrical opening 38 extending therethrough with the diameter of the opening 38 being greater than the diameter of shaft 34.

An annular cylindrical metal sleeve 39 has an inner diameter which is slightly larger than the diameter of shaft 34 so that sleeve 39 can be positioned about shaft 34 for rotation with respect thereto. An annular shock absorber 41 of a suitable elastomeric material has an inner diameter which conforms to the outer diameter of sleeve 39 and an outer diameter which corresponds to the diameter of opening 38 such that shock absorber 41 is between and preferably in contact with each of sleeve 39 and pod support 37. A flat annular washer 42 is positioned about shaft 34 and between bracket member 31 and shell 39, while a flat annular washer 43 is positioned about shaft 34 and between bracket member 32 and sleeve 39. Each of washers 42 and 43 is formed of a suitable shock absorbing material and has an inner diameter corresponding to the diameter of shaft 34 and an outer diameter which is greater than the outer diameter of shock absorber 41.

In order to accommodate situations where the shell 39 is not in the desired centered position between bracket members 31 and 32, one or more annular shims 44 can be placed about shaft 34 between elastomeric washer 42 and bracket member 31, and/or one or more annular shims 45 can be placed about shaft 34 between elastomeric washer 43 and bracket member 32, to minimize side to side vibration. Similarly, in order to accommodate situations where the pod support 37 is not centered between bracket members 31 and 32, one or more annular shims 46 can be placed about shell 39 between elastomeric washer 42 and pod support 37, and/or one or more annular shims 47 can be positioned about sleeve 39 between elastomeric washer 43 and pod support 37. However, the pivot hinge members can never be shimmed perfectly, and most certainly cannot be shimmed enough to pre-load the elastomeric washers 42 and 43. One end of a retainer arm 48 can be secured to one end of shaft 34 while the other end of retainer arm 48 can be secured to chassis 12 by bolt 49 and spacer 50. Thus the shaft 34 is prevented from rotating relative to bracket members 31 and 32.

Referring now to FIGS. 5, 6 and 7, the right front pivot hinge 21 in accordance with a first embodiment of the present invention has a first bracket member 51 securely mounted to a portion of chassis frame 12, while a second bracket member 52 is spaced outwardly from and generally parallel to first bracket member 51 by a support element 53. Support element 53 can be welded to bracket members 51 and 52, while bracket member 51 can be welded to vehicle chassis 12. Bracket members 51 and 52 of the right side pivot hinge 21 are parallel to the corresponding bracket members of the left side pivot hinge 22, and preferably extend at least generally vertically.

Bracket member 51 has an opening 54 extending therethrough in coaxial alignment with an opening 55 located in the bracket member 52. A generally cylindrical pivot shaft 56 has a first cylindrical end portion 57, an intermediate cylindrical portion 58, and a second cylindrical end portion 59, with the diameter of the first shaft end portion 57 being greater than the diameter of the intermediate shaft portion 58 so as to form a first shoulder 61 therebetween. The diameter of the second shaft end section 59 will generally be no greater than, and preferably will be less than the diameter of intermediate shaft section 58. Each of first shaft end section 57 and second shaft end section 59 has external threads thereon. The diameter of opening 54 in bracket member 51 is greater than the diameter of the intermediate shaft section 58 and the diameter of the second shaft end section 59 so that at least the second shaft end section 59 can extend into and through the opening 54. Bracket member 52 has internal threads in the annular wall of opening 55 to matingly receive the external threads on the first end section 57 of shaft 56. Thus the second shaft end section 59 can be inserted through opening 55 and then through opening 54 until the external threads on first shaft end section 57 have securely engaged the internal threads in opening 55.

Pod support element 62 is fixedly secured to pod 15, and has a thickness which is less than the distance between bracket members 51 and 52, so that pod support element 62 can be positioned between bracket members 51 and 52. Pod support member 62 has a cylindrical opening 63 extending therethrough with the diameter of the opening 63 being greater than the diameter of intermediate shaft section 58 and the diameter of second shaft end section 59. A flanged metal spool, in the form of first and second spool end halves 64 and 65, has an inner diameter which is at least as large as the diameter of intermediate section 58 of shaft 56 and is less than the diameter of the first end section 57 of shaft 56. Preferably, the inner diameter of the metal spool closely corresponds to the diameter of intermediate section 58 of shaft 56. Spool end half 64 has a cylindrically annular sleeve section 66, which extends coaxially with shaft 56, and a flange section 67 which extends radially outwardly, in a plane which is perpendicular to the longitudinal axis of shaft 56, from the end of the sleeve section 66 closest to bracket member 52. Similarly, spool end half 65 has a cylindrically annular sleeve section 68, which extends coaxially with shaft 56, and a flange section 69 which extends radially outwardly, in a plane which is perpendicular to the longitudinal axis of shaft 56, from the end of the sleeve section 68 closest to bracket member 51. The outer diameters of the sleeve sections 66 and 68 are less than the diameter of the opening 63 through pod support 62, while the outer diameters of flange sections 67 and 69 are greater than the diameter of the opening 63.

A shock absorber, in the form of a central sleeve section located between first and second ends sections, with the end sections extending at least generally radially outwardly from shaft 56, comprises first and second spool end halves 71 and 72. Spool end halves 71 and 72 are made of a suitable elastomeric material and have inner diameters which closely correspond to the outer diameters of sleeve sections 66 and 68. Spool end half 71 has a cylindrically annular sleeve section 73, which extends coaxially with shaft 56, and a flange section 74 which extends radially outwardly from the end of the sleeve section 73 closest to bracket member 52. Similarly, spool end half 72 has a cylindrically annular sleeve section 75, which extends coaxially with shaft 56, and a flange section 76 which extends radially outwardly from the end of the sleeve section 75 closest to bracket member 51. The outer diameters of the sleeve sections 73 and 75 closely correspond to the diameter of the opening 63 through pod support 62, while the outer diameters of flange sections 74 and 76 are greater than the diameter of the opening 63. In the embodiment illustrated in FIG. 5, the pod support 62 has annular recesses around each end of opening 63 to receive resilient flanges 74 and 76. Flanges 74 and 76 provide a resilient resistance to the movement of the pod support element 63 in a direction parallel to the longitudinal axis of shaft 56, while the central sleeve sections 73 and 75 provide a resilient resistance to the movement of pod support element 63 in a direction perpendicular to the longitudinal axis of shaft 56.

During the assembly of the pivot hinge of FIG. 5, the shock absorber elements 71 and 72 are inserted into the opening 63 from opposite ends of opening 63. The metal shell elements 64 and 65 are inserted into the axial passageway formed by shock absorber elements 71 and 72 from opposite ends thereof. With the shock absorber elements 71 and 72 and shell elements 64 and 65 in place, the pod support 62 is positioned between bracket members 51 and 52 with the axial passageway through shell elements 64 and 65 being coaxial with the openings 54 and 55 in bracket members 51 and 52. The shaft 56 is then placed in position by inserting end section 59 through opening 55 in bracket member 52, through the axial passageway formed by shell elements 64 and 65, and through opening 54 in bracket member 51. Shaft 56 is then rotated by suitable means, e.g. an Allen wrench (not shown) inserted into the hexagonal tool engagement socket 77 formed in the terminus or outer end of shaft end section 57 coaxially with shaft 56. The rotation of shaft 56 causes the engagement of the external threads on shaft end section 57 with the internal threads in opening 55 in bracket member 52, and is continued until shoulder 61 engages annular shell flange 67. A cylindrically annular spacer sleeve 78, having an internal diameter greater than the diameter of intermediate shaft section 5B and an outer diameter less than the diameter of opening 54 in bracket member 51, is loosely telescoped over intermediate shaft section 58 and freely moved coaxially therewith through opening 54 until spacer sleeve contacts annular shell flange 69. A retention washer 79 is then placed about shaft end section 59 and moved axially into contact with the outer end of spacer sleeve 78. An internally threaded retention element, e.g., in the form of a self locking retaining nut 81, is placed in threaded engagement with the external threads on shaft end section 59 and rotated until shell elements 64 and 65, spacer sleeve 78, and retention washer 79 are tightly gripped between shoulder 61 and the retention element 81. Washer 79 is positioned about shaft 56 in a force transmitting relationship between spacer sleeve 78 and nut 81. When the pod 15 is tilted, the shaft 56, retaining nut 81, washer 79, metal shell 66–69, elastomeric shock absorber 73–76, and pod support 62 rotate as a unit. After assembly, shaft 56 can be rotated by the insertion of a tool into socket 77 to adjust the position of annular shell 66–69 with respect to bracket members 51 and 52.

As shown in FIGS. 5–7, the present invention can accommodate a situation where the pod support 62 is essentially midway between bracket members 51 and 52 (FIG. 5), a situation where the vertical centerline of the pod support 62 is positioned outwardly of the vertical midline between bracket members 51 and 52 (FIG. 6), and a situation where the vertical centerline of the pod support 62 is positioned inwardly of the vertical midline between bracket members 51 and 52 (FIG. 7). This arrangement permits the achievement of a precise lateral preload to the elastomeric shock absorbers in all conditions of lateral location of the brackets. This arrangement also provides isolation of the pod in all directions with no looseness of the pivot hinge elements.

In addition, the shaft 56 is strong enough to take the expected rollover and rear push forces. Also, since the shaft 56 is not rotationally fixed to the mounting brackets 51 and 52, the pod 15 can be rotated upwardly with the shaft 56 being the center of pivot. The rotating parts relative to the brackets 51 and 52 are the threaded end of the shaft 56 and spacer sleeve 78, both of which can be treated to prevent corrosion. The shaft 56 does move longitudinally along its axis during the rotation of the pod 15; however, the magnitude of such longitudinal movement is very small. Assuming sixteen threads to the inch on shaft head 57, a full 90° rotation of pod 15 would result in a longitudinal movement of shaft 56 of only 1/64 inch. A reinforcing ring 82 can be welded to bracket member 51 in the area surrounding opening 54, to provide more support for spacer sleeve 78 and the inner shaft end 59.

Referring now to FIG. 8, the right front pivot hinge 21 in accordance with a second embodiment of the invention, is illustrated. Elements which are common to the embodiment of FIG. 5 are identified with the same reference numerals. The metal spool is formed from three pieces 91, 92, and 93 instead of the two spool end halves 64 and 65 of FIG. 5. Element 91 is a cylindrically annular sleeve which extends coaxially with shaft 56 for an axial length essentially equal to the thickness of pod support 62. Annual washer elements 92 and 93 extend radially outwardly from shaft 56 adjacent the opposite ends of sleeve 91, with the inner diameters of elements 91, 92, and 93 closely corresponding to the diameter of intermediate shaft section 58, and the outer diameters of washers 92 and 93 being greater than the diameter of the passageway 63 through pod support 62. The shock absorber comprises a first element having an annular sleeve section 94 and a radial flange section 95 and a second element in the form of a flat annular disc 96. Sleeve section 94 extends coaxially with respect to metal sleeve 91 and shaft 56, while each of flange section 95 and annular disc 96 extends radially outwardly from sleeve 91 in a plane perpendicular to the longitudinal axes of shaft 56 and sleeve 91.

During the assembly of the pivot hinge of FIG. 8, the shock absorber element 94, 95 is inserted into opening 63 from one end while shock absorber element 96 is positioned about the other end of opening 63. The metal shell element 91 is inserted through the opening in shock absorber element 94, 95 and the washer elements 92 and 93 are positioned at each end of sleeve element 91. With the shock absorber elements 94, 95, and 96 and shell elements 91, 92, and 93 in place, the pod support 62 is positioned between bracket members 51 and 52 with the axial passageway through shell elements 91, 92, and 93 being coaxial with the openings 54 and 55 in bracket members 51 and 52, respectively. The shaft 56 is then placed in position by inserting end section 59 through opening 55 in bracket member 52, through the axial passageway formed by shell elements 91, 92, and 93, and through opening 54 in bracket member 51. Shaft 56 is then rotated by suitable means to cause the engagement of the external threads on shaft end section 57 with the internal threads in opening 55 in bracket member 52, until shoulder 61 engages annular shell flange 67. Annular spacer sleeve 78 is placed about intermediate shaft section 5 and freely moved coaxially therewith through opening 54 until spacer sleeve 78 contacts shell flange element 93. Retention washer 79 is then placed about shaft end section 59 and moved axially into contact with the outer end of spacer sleeve 78, and nut 81 is placed in threaded engagement with the external threads on shaft end section 59 and rotated until shell elements 91, 92, and 93, spacer sleeve 78, and retention washer 79 are tightly gripped between shoulder 61 and nut 81.

As with the embodiment shown in FIGS. 5-7, the embodiment of FIG. 8 can accommodate a situation where the pod support 62 is midway between bracket members 51 and 52, is positioned outwardly of the vertical midline between bracket members 51 and 52, or is positioned inwardly of the vertical midline between bracket members 51 and 52.

The elastomeric shock absorber and the associated shell which is positioned between the pod support 62 and the shaft 56 can have any number of other configurations and still be useful in the present invention. The elastomeric shock absorber element 75, 76 can be prebonded to the metal spool half 65, while the elastomeric shock absorber element 73, 74 can be prebonded to metal spool half 64. The elastomeric shock absorber element 94, 95 can be prebonded to metal sleeve 91 while washers 92 and 93 are unattached to sleeve 91 or the elastomeric shock absorber. The flange sections of the shock absorber element can be formed integrally with the central sleeve section, or only one flange section can be formed integrally with the sleeve section, or both flange sections can be formed separately from the central sleeve section. While the support element 62 has illustrated as being attached to the pod 15 and the bracket members 51 and 52 as being attached to the chassis 12, the positions can be reversed. While any suitable number of pivot hinges can be employed, two pivot hinges will be preferred for most situations. While the shaft 56 has been illustrated with the shaft head 57 being outboard, it is possible to reverse the orientation of the shaft 56 in a pivot hinge so that the shaft head 57 is inboard. Other variations and modifications to the invention are possible within the scope of the foregoing description and the appended claims.

I claim:

1. In an apparatus comprising a body frame, a tiltable element, and a plurality of devices for pivotably mounting said tiltable element to said body frame, the improvement wherein each of said devices comprises:

first and second spaced apart, generally parallel bracket members secured to a first one of said body frame and said tiltable element, a support element secured to the second one of said body frame and said tiltable element, said support element having a first opening extending therethrough, a second opening located in said first bracket member in coaxial alignment with a third opening located in said second bracket member and with said first opening in said support element, a generally cylindrical shaft positioned in said first, second and third openings, said shaft having first and second shaft end sections and an intermediate shaft section therebetween, the diameter of said first shaft end section being greater than the diameter of said intermediate shaft section so as to form a first shoulder therebetween, each of said first and second shaft end sections having external threads thereon, said first bracket member having internal threads in said second opening to matingly receive the threads on said first shaft end section, an annular shell having an inner diameter at least as large as the diameter of said intermediate shaft section and less than the diameter of said first shaft end section, an annular resilient sleeve mounted circumferentially about said annular shell and in contact with said annular shell and said support element, an annular spacer sleeve positioned coaxially with said shaft and extending through said third opening with the outer diameter of said spacer sleeve being slightly less than the diameter of said third opening, and an internally threaded retention element engaged with the threads on said second shaft end section to fixedly position said annular shell and said spacer sleeve between said first shoulder and said retention element.

2. An apparatus in accordance with claim 1 wherein said apparatus is a vehicle.

3. A vehicle in accordance with claim 2 wherein said tiltable element comprises an operator cab.

4. A vehicle in accordance with claim 3 wherein said bracket members are fixedly secured to said body frame and each said support element is fixedly secured to said operator cab.

5. A vehicle in accordance with claim 4 wherein each of said devices further comprises an annular washer positioned about said shaft in force transmitting relationship between said spacer sleeve and said retention element.

6. A vehicle in accordance with claim 5 wherein each said shaft has a tool engagement surface to facilitate the application of a tool thereto to rotate the said shaft about its longitudinal axis and thereby adjust the position of the respective annular shell with respect to the associated first and second bracket members.

7. A vehicle in accordance with claim 6 wherein each said tool engagement surface is in the terminus of the first shaft end section of the respective shaft remote from the associated first shoulder.

8. A vehicle in accordance with claim 7 wherein each said annular shell comprises a cylindrically annular component and first and second end flange components, the cylindrically annular component being positioned coaxially with the respective shaft while the first and second end flange components are positioned at least generally perpendicularly to the longitudinal axis of the respective shaft.

9. A vehicle in accordance with claim 8 wherein each said annular resilient sleeve has a central section located between first and second resilient end sections, the first and second resilient end sections extending at least generally radially with respect to the associated shaft, outwardly from the ends of the central section to encompass at least a portion of the support element in the region surrounding the first opening extending through the support element to provide a resilient resistance to the movement of the support element in a direction parallel to the longitudinal axis of the associated shaft as well as a resilient resistance to the movement of the support element in a direction perpendicular to the longitudinal axis of the associated shaft.

10. A vehicle in accordance with claim 9 wherein at least one of the first and second resilient end sections is formed separate from the associated central section.

11. A vehicle in accordance with claim 10 wherein at least one of the first and second end flange components is formed separately from the associated cylindrically annular component.

12. A vehicle in accordance with claim 9 wherein at least one of the first and second resilient end sections is formed integrally with the associated central section.

13. A vehicle in accordance with claim 12 wherein each cylindrically annular component is integrally formed with the associated first and second end flange components.

14. A vehicle in accordance with claim 13 wherein each annular resilient sleeve is at least partially formed of an elastomeric material.

15. A vehicle in accordance with claim 1 wherein each of said devices further comprises an annular washer positioned about said shaft in force transmitting relationship between said spacer sleeve and said retention element.

16. A vehicle in accordance with claim 15 wherein each said shaft has a tool engagement surface to facilitate the application of a tool thereto to rotate the said shaft about its longitudinal axis and thereby adjust the position of the respective annular shell with respect to the associated first and second bracket members.

17. A vehicle in accordance with claim 16 wherein each said tool engagement surface is in the terminus of the first shaft end section of the respective shaft remote from the associated first shoulder.

18. A vehicle in accordance with claim 1 wherein each said annular shell comprises a cylindrically annular component and first and second end flange components, the cylindrically annular component being positioned coaxially with the respective shaft while the first and second end flange components are positioned at least generally perpendicularly to the longitudinal axis of the respective shaft.

19. A vehicle in accordance with claim 18 wherein each said annular resilient sleeve has a central section located between first and second resilient end sections, the first and second resilient end sections extending at least generally radially, with respect to the associated shaft, outwardly from the ends of the central section to encompass at least a portion of the support element in the region surrounding the first opening extending through the support element to provide a resilient resistance to the movement of the support element in a direction parallel to the longitudinal axis of the associated shaft as well as a resilient resistance to the movement of the support element in a direction perpendicular to the longitudinal axis of the associated shaft.

20. A vehicle in accordance with claim 19 wherein at least one of the first and second resilient end sections is formed separate from the associated central section.

21. A vehicle in accordance with claim 20 wherein at least one of the first and second end flange components is formed separately from the associated cylindrically annular component.

22. A vehicle in accordance with claim 19 wherein at least one of the first and second resilient end sections is formed integrally with the associated central section.

23. A vehicle in accordance with claim 22 wherein each cylindrically annular component is integrally formed with the associated first and second end flange components.

24. A vehicle in accordance with claim 23 wherein each annular resilient sleeve is at least partially formed of an elastomeric material.

* * * * *